US009412135B2

(12) United States Patent
Smith et al.

(10) Patent No.: US 9,412,135 B2
(45) Date of Patent: Aug. 9, 2016

(54) CHECK DATA LIFT FOR ONLINE ACCOUNTS

(71) Applicant: Bank of America Corporation, Charlotte, NC (US)

(72) Inventors: Michael Gerald Smith, Fort Mill, SC (US); Scott Andrew Johnson, Atlanta, GA (US); Brian David Hanson, Charlotte, NC (US); Hyunmo Koo, Atlanta, GA (US); Saravana Kumar Govindarajan, Atlanta, GA (US); Michael Scott Hjellming, Cherryville, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/065,800

(22) Filed: Oct. 29, 2013

(65) Prior Publication Data
US 2015/0120516 A1 Apr. 30, 2015

(51) Int. Cl.
G07B 17/00 (2006.01)
G07F 19/00 (2006.01)
G06Q 40/00 (2012.01)
G06Q 40/02 (2012.01)

(52) U.S. Cl.
CPC .............. *G06Q 40/12* (2013.12); *G06Q 40/02* (2013.01)

(58) Field of Classification Search
None
See application file for complete search history.

(56) References Cited

U.S. PATENT DOCUMENTS

| 4,258,644 | A | | 3/1981 | Goettert et al. |
|---|---|---|---|---|
| 5,097,517 | A | | 3/1992 | Holt |
| 5,433,483 | A | | 7/1995 | Yu |
| 5,644,352 | A | | 7/1997 | Chang et al. |
| 5,668,897 | A | * | 9/1997 | Stolfo ............. 382/283 |
| 5,704,651 | A | | 1/1998 | Phillips |
| 5,740,271 | A | | 4/1998 | Kunkler et al. |
| 5,748,780 | A | * | 5/1998 | Stolfo ............. 382/232 |
| 5,873,604 | A | | 2/1999 | Phillips |
| 6,125,196 | A | | 9/2000 | Carey et al. |
| 6,564,996 | B2 | | 5/2003 | Hoffman et al. |
| 6,574,377 | B1 | * | 6/2003 | Cahill et al. ............. 382/305 |
| 7,104,709 | B1 | | 9/2006 | Maher et al. |
| 7,364,071 | B2 | | 4/2008 | Esplin et al. |
| 7,494,052 | B1 | | 2/2009 | Carpenter et al. |
| 7,631,801 | B2 | | 12/2009 | Sellen et al. |
| 7,729,990 | B2 | | 6/2010 | Marceau et al. |
| 7,856,403 | B2 | | 12/2010 | Venturo et al. |
| 7,876,949 | B1 | * | 1/2011 | Oakes et al. ............. 382/137 |
| 8,141,692 | B2 | * | 3/2012 | Spall et al. ............. 194/206 |
| 8,162,125 | B1 | | 4/2012 | Csulits et al. |
| 8,165,381 | B1 | | 4/2012 | Ferris et al. |
| 8,351,677 | B1 | * | 1/2013 | Oakes et al. ............. 382/137 |
| 8,660,984 | B1 | * | 2/2014 | Bhattacharyya et al. ..... 707/602 |
| 8,768,038 | B1 | | 7/2014 | Sherman et al. |
| 2002/0012462 | A1 | * | 1/2002 | Fujiwara ............. 382/165 |
| 2002/0052852 | A1 | * | 5/2002 | Bozeman ............. 705/64 |

(Continued)

Primary Examiner — Fateh M Obaid
(74) Attorney, Agent, or Firm — Michael A. Springs; Moore & Van Allen PLLC; Patrick B. Home

(57) ABSTRACT

Embodiments for extracting data for online account includes systems that receive at least one check images, apply one or more optical character recognition processes to at least a portion of the at least one check image, and convert image based data to text based data. The embodiments further identify check data in the text based data, identify online data from the check data, incorporate at least a portion of the online data into a portion of an online account, and provide the online account portion to a customer.

20 Claims, 6 Drawing Sheets

(56) References Cited

U.S. PATENT DOCUMENTS

| | | | |
|---|---|---|---|
| 2002/0076093 A1 | 6/2002 | Palmer et al. | |
| 2002/0091945 A1 | 7/2002 | Ross | |
| 2003/0059098 A1 | 3/2003 | Jones et al. | |
| 2003/0177100 A1 | 9/2003 | Filatov | |
| 2004/0254881 A1 | 12/2004 | Kumar et al. | |
| 2005/0021456 A1 | 1/2005 | Steele et al. | |
| 2005/0021466 A1 | 1/2005 | Buchanan et al. | |
| 2005/0125339 A1* | 6/2005 | Tidwell et al. | 705/39 |
| 2005/0163362 A1 | 7/2005 | Jones et al. | |
| 2005/0182792 A1 | 8/2005 | Israel et al. | |
| 2006/0278724 A1 | 12/2006 | Walker et al. | |
| 2007/0235520 A1* | 10/2007 | Smith et al. | 235/379 |
| 2007/0255653 A1* | 11/2007 | Tumminaro et al. | 705/39 |
| 2007/0288382 A1 | 12/2007 | Narayanan et al. | |
| 2008/0086421 A1* | 4/2008 | Gilder et al. | 705/44 |
| 2008/0167990 A1 | 7/2008 | Grant | |
| 2008/0180750 A1* | 7/2008 | Feldman | 358/3.28 |
| 2008/0219543 A1 | 9/2008 | Csulits et al. | |
| 2008/0247629 A1* | 10/2008 | Gilder et al. | 382/137 |
| 2009/0114716 A1* | 5/2009 | Ramachandran | 235/379 |
| 2009/0141962 A1* | 6/2009 | Borgia et al. | 382/139 |
| 2009/0144129 A1 | 6/2009 | Grouf et al. | |
| 2009/0222364 A1 | 9/2009 | McGlynn et al. | |
| 2009/0276368 A1 | 11/2009 | Martin et al. | |
| 2009/0285471 A1 | 11/2009 | Wall et al. | |
| 2010/0082470 A1* | 4/2010 | Walach et al. | 705/35 |
| 2010/0296719 A1* | 11/2010 | Williamson et al. | 382/137 |
| 2011/0087598 A1* | 4/2011 | Bozeman | 705/45 |
| 2011/0170740 A1* | 7/2011 | Coleman | 382/103 |
| 2011/0208588 A1 | 8/2011 | Joa et al. | |
| 2013/0315467 A1 | 11/2013 | Hawkins | |

* cited by examiner

ONLINE STATEMENT
XXXX Checking Account

610

Customer Name
Address

| Date | Check No. | Amount | Payee | Description |
|------|-----------|--------|-------|-------------|
| DD/MM/YY | XXX | +XX.XX | Customer Name | Deposit at ATM branch location |
| DD/MM/YY | XXX | +X.XX | Customer Name | Rebate Merchant 1 |
| DD/MM/YY | XXxxX | -XXX.XX | *Payee 1* | Automatic Payment |
| DD/MM/YY | XXxxX | +XX.XX | Payee 2 | Incoming Check |
| DD/MM/YY | XXxxX | -XX.XX | Customer Name | Withdrawal at ATM branch location |
| DD/MM/YY | | | Payee 3 | Outgoing Check |

*None Selected*
*Payor*
*Memo line*
*Related trxs*
*Remaining balance*
*Trnx time*

Edit Payee Information 650
[ Paye| ]
Select from list of suggestions
Payee 2
Customer Name
Payee

CHECK DATA LIFT FOR ONLINE ACCOUNTS

BACKGROUND

Certain businesses often receive large quantities of images related to transaction for archiving, processing, and analyzing. As a service to their customers, these businesses often provide these images to aid customers in reconciling transactions. Due to the varied period of time that the image records are stored, the many different types of records received by the businesses, and the large volume of records, organizing and analyzing the image records can be difficult. Further still, in some instances businesses may receive the same or similar images from a wide variety of entities, and determining which images must be processed and retained and which images may be discarded can present even more difficulties.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The embodiments provided herein are directed to systems for extracting check data for online accounts. In some embodiments, the systems include a computer apparatus including a processor and a memory and a software module stored in the memory, comprising executable instructions that when executed by the processor cause the processor to receive a check image. In some embodiments, the executable instruction further cause the processer to apply an optical character recognition process to at least a portion of the check image. In some embodiments, the executable instruction further cause the processer to convert image based data to text based data. In some embodiments, the executable instruction further cause the processer to identify check data in the text based data comprising at least one of a payee name, a payor name, a date, a payment amount, a check number, and an endorsement. In some embodiments, the executable instructions further cause the processer to identify online data from the check data. In some embodiments, the executable instructions further cause the processer to incorporate at least a portion of the online data into a portion of an online account. In some embodiments, the executable instruction further cause the processer to provide the online account portion to a customer.

In additional embodiments of the systems, the executable instructions further cause the processor to format the online data based on online account criteria, and incorporate at least a portion of the formatted online data into the portion of the online account, wherein the online account criteria includes at least one of security parameters, privacy parameters, and formatting parameters. In other embodiments of the systems, the executable instructions further cause the processor to redact at least a portion of the online account data, add calculations and reports to the online account data consistent with a status of the online account, or modify the style of text in the online account data. In still other embodiments of the systems, the executable instructions further causes the processor to receive input associated with the online data from the customer and update the online account portion based on the customer input, wherein the customer input includes data corrections, data updates, and requests for additional information. In some embodiments of the systems, the executable instructions further cause the processor to reposition the online data in an online account statement in response to the received input.

In further embodiments of the systems, the OCR process includes location fields for determining the position of data on the check image. In some embodiments of the systems, the executable instructions further cause the processor t detect unrecognized data from the check image and receive input information identifying the unrecognized data from an operator, wherein the potential online data comprises at least a portion of the inputted information. In other embodiments of the systems, the executable instructions further cause the processor to receive additional input information from a customer and correct the operator inputted information based on the additional input. In still other embodiments, the check data further comprises financial record data comprising terms of a financial record, time period that the financial record is in effect, account numbers, merchant codes, file identifiers, or source identifiers. In further embodiments, the online account portion comprises an online statement, a financial record, an online financial account web page, or an online tool.

Also provided herein, are embodiments directed to a computer program product for extracting check data for online accounts. In some embodiments, the computer program product includes a computer readable storage medium having computer readable program code embodied therewith, the computer readable storage medium having computer readable program code embodied therewith, the computer readable program code comprising computer readable program code configured to receive a check image. In some embodiments, the computer readable program code includes computer readable program code configured to apply an optical character recognition process to at least a portion of the check image. In some embodiments, the computer readable program code includes computer readable program code configured to convert image based data to text based data. In some embodiments, the computer readable program code includes computer readable program code configured to identify check data in the text based data comprising at least one of a payee name, a payor name, a date, a payment amount, a check number, and an endorsement. In some embodiments, the computer readable program code includes computer readable program code configured to identify online data from the check data. In some embodiments, the computer readable program code includes computer readable program code configured to incorporate at least a portion of the online data into a portion of an online account. In some embodiments, the computer readable program code includes computer readable program code configured to provide the online account portion to a customer.

In some embodiments, the computer readable program code includes computer readable program code configured to format the online data based on online account criteria and incorporate at least a portion of the formatted online data into the portion of the online account, wherein the online account criteria includes at least one of security parameters, privacy parameters, and formatting parameters. In some embodiments, the computer readable program code includes computer readable program code configured to redact at least a portion of the online account data, add calculations and reports to the online account data consistent with a status of the online account, or modify the style of text in the online account data. In some embodiments, the computer readable program code includes computer readable program code configured to receive input associated with the online data from the customer and update the online account portion based on the customer input, wherein the customer input includes data corrections, data updates, and requests for additional information. In some embodiments, the computer readable program code includes computer readable program code configured to detect unrecognized data from the check image and receive input information identifying the unrecognized data from an operator, wherein the potential online data comprises at least a portion of the inputted information. In some embodiments, the computer readable program code includes computer readable program code configured to receive additional input information from a customer and correct the operator inputted information based on the additional input.

Further provided herein are embodiments directed to computer-implemented methods for extracting check data for online accounts. In some embodiments, the methods include receiving a check image. In some embodiments, the methods include applying, by a processor, an optical character recognition process to at least a portion of the check image. In some embodiments, the methods include converting, by a processor, image based data to text based data. In some embodiments, the methods include identifying, by a processor, check data in the text based data comprising at least one of a payee name, a payor name, a date, a payment amount, a check number, and an endorsement. In some embodiments, the methods include identifying, by a processor, online data from the check data. In some embodiments, the methods include incorporating, by a processor, at least a portion of the online data into a portion of an online account. In some embodiments, the methods include providing, by a processor, the online account portion to a customer.

In further embodiments, the methods include formatting, by a processor, the online data based on online account criteria and incorporating, by a processor, at least a portion of the formatted online data into the portion of the online account, wherein the online account criteria includes at least one of security parameters, privacy parameters, and formatting parameters. In other embodiments, the methods include redacting, by a processor, at least a portion of the online account data; adding, by a processor, calculations and reports to the online account data consistent with a status of the online account; or modifying, by a processor, the style of text in the online account data. In still embodiments, the methods include receiving input associated with the online data from the customer and updating the online account portion based on the customer input, wherein the customer input includes data corrections, data updates, and requests for additional information.

Other aspects and features, as recited by the claims, will become apparent to those skilled in the art upon review of the following non-limited detailed description of the invention in conjunction with the accompanying figures.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 6 is an exemplary graphical user interface of an online statement in accordance with various embodiments.

DETAILED DESCRIPTION

Figure 1:
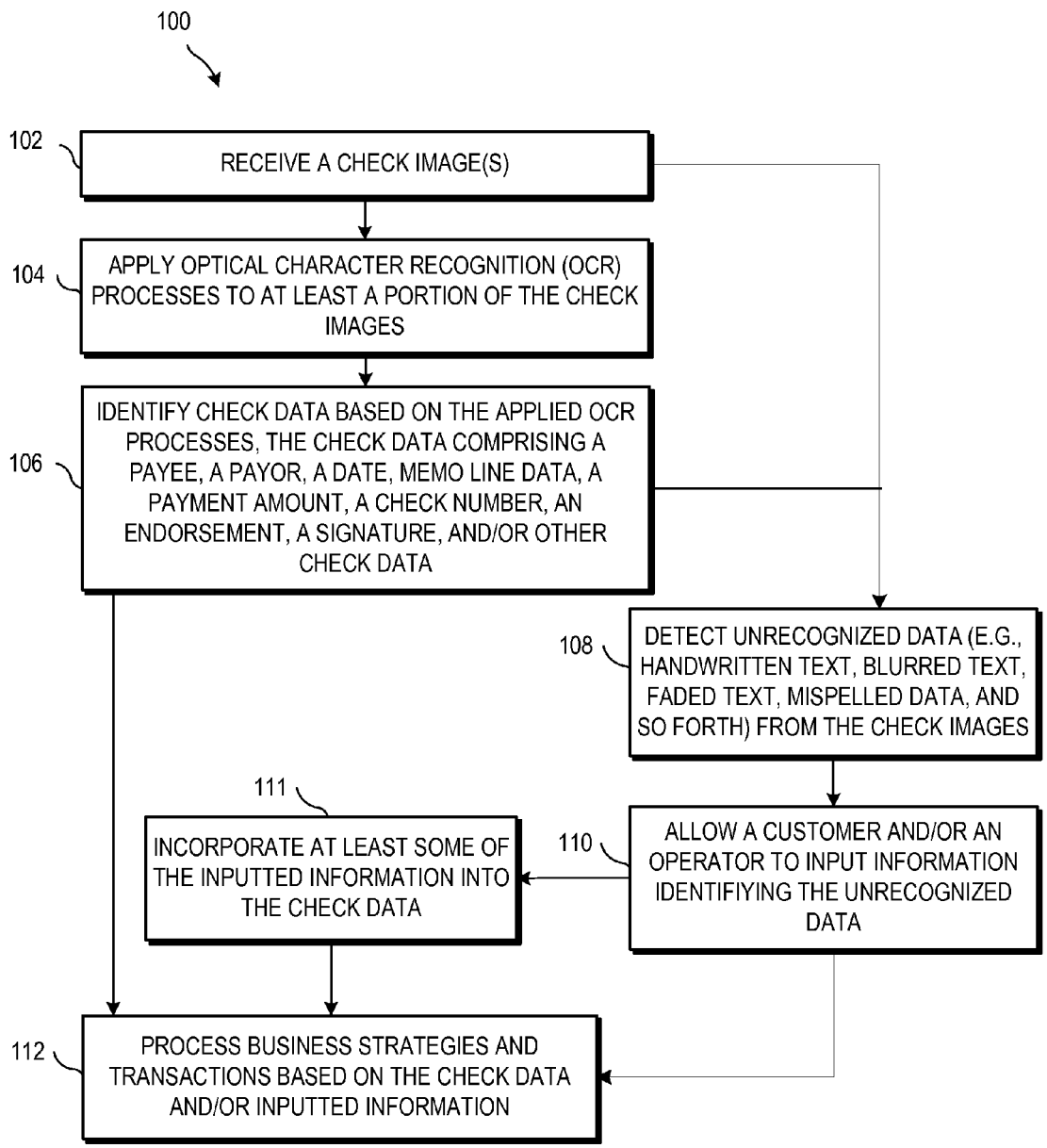
FIG. 1 is a flowchart illustrating a system and method for identifying and extracting check data in accordance with various embodiments.

The embodiments presented herein are directed to systems, methods, and computer program products for detecting and extracting data from check images. As presented herein, metadata extracted from the check images can be used in processing or automating transactions, implementing business strategies, and providing enhanced online account information to customers. In some embodiments, the images include images of check or other financial records captured by an account holder or other entity. In particular embodiments, optical character recognition processes and keying operations are utilized to extract the metadata from check or other financial instruments.

The embodiments of the disclosure may be embodied as a system, method, or computer program product. Accordingly, aspects of the present disclosure may take the form of an entirely hardware embodiment, an entirely software embodiment (including firmware, resident software, micro-code, and so forth) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that detect and extract specific data from images and that analyze, process, and distribute the metadata are provided. As used herein, the term "financial record" refers to, but is not limited to records associated with financial record data, account data, government data, legal data, identification data, and the like. Exemplary financial records include legal documents, wills, court papers, legal memorandum, leases, birth certificates, checks, receipts, contracts, loan documents, financial statements, bills, and the like. Although the disclosure is directed to financial records, it will be understood that non-financial records such as social communications, advertising, blogs, opinion writing, and the like may also be applicable to the disclosure presented herein. In cases were non-financial records are used, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof.

Referring now to the figures, FIG. 1 provides a flowchart illustrating a process 100 for detecting and extracting data from check images. One or more devices, such as the one or more systems and/or one or more computing devices and/or servers of FIG. 2, can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images comprise at least a portion of the front of the check, at least a portion of the back of the check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. Although check images are described in FIG. 1, it will be understood that any type of financial record image or non-financial record image may be included in process 100.

In some embodiments, each of the check images comprises financial record data. The financial record data includes dates of issuance of financial record, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like. In other embodiments, the check images comprise markings. The markings include, for example, text, numbers, symbols, other characters, lines, shadows, shapes, ink blots, stains, logos, paper tears, smudges, watermarks, any visible marking on the paper check, any visible marking applied electronically to the check image, or any pixel/texel quantity thereof.

Although check images are illustrated in FIG. 1, it will be understood that any type of image (e.g., PDF files, scanned documents, digital photographs with or without letters, numbers, and the like) or financial record may be received in accordance with the embodiments of FIG. 1. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, joint account holder, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes are applied to at least a portion of the check images. At least one OCR process may be applied to each of the check images or some of the check images. The OCR processes enables the system to convert handwritten or printed text and other symbols in the check image to machine encoded text such as text based files that can be edited and searched. The data in the check images can also be extracted and converted into metadata, which can then be used and incorporated into a variety of applications, documents, and processes. In some embodiments, OCR based algorithms incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters. In additional embodiments, the OCR processes include intelligent character recognition (ICR), which can be used to recognize and extract handwritten portions or other portions of the check image.

In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants (see, e.g., FIG. 4).

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 106, check data is identified based on the applied OCR processes. In some embodiments, the check data comprises a payee, a payor, a date, memo line data, a payment amount, a check number, and endorsement, a signature and/or other check data. The check data, in some embodiments, is identified based on the final objectives of the process 100. As discussed in more detail below, the final objectives of the process 100 can include a variety of business strategies and transactions. In other embodiments, the system of process 100 identifies all recognizable text and markings in the check images. In such cases, the system may further narrow or expand the identified check data as needed.

In further embodiments, the system of process 100 assigns a confidence level to at least a portion of the identified check data. The confidence level includes a pass/fail rating, a graded score, a percentage score, an assigned value, or any other indication that the check data is accurate, relevant, or otherwise acceptable. In this way, any data identified and extracted via the OCR processes and/or any data inputted from an operator or customer can be screened before such data is used in the business strategies and transaction described herein below.

In some embodiments, the confidence level is assigned to the check data based on the number of times the OCR processes is applied to a check image, the quality of the check image, the quality of the identified check data extracted from the check image, whether or not the check data can be verified, and the like. If the check image includes blurred text or has a low pixel count, the text produced by a first round of the OCR processes may be assigned a low confidence level. In such cases, the confidence level may be increased if the check images undergo additional rounds of the OCR processes. In other cases, the system may compare the check data to previously confirmed data to assign the confidence level. For example, a verified signature or other verified data may be compared to the check data. If the check data and the previously confirmed data match, at least a portion of the check data may be assigned a "pass" score. In other instances, the check data may be assigned a "fail" score if the check data and confirmed data do not match. In cases where the confidence level is below a certain level or the check data is otherwise unsatisfactory, the system of process 100 may repeat the same of different OCR processes for at least a portion of a check image, apply a different data identification technique to the check image (e.g., image overlay), adjust the quality of the check image, receive confirmation of the check data from the customer, block further processing of the check images, provide the check images to an analysis group, and so forth.

As illustrated at block 108, unrecognized data from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct such text before applying the OCR processes to increase successfully recognition in the OCR processes or other image processes.

As illustrated at block 110, inputted information identifying the unrecognized data from a customer and/or an operator is received. In some embodiments, an operator is provided with the portions of a check image corresponding to the unrecognized data. The operator can view the unrecognized data to translate the unrecognized data into text and input the translation into a check data repository. In this way, the system "learns" to recognize previously unrecognized data such that when the system reviews the same or similar unrecognized data in the future, such data can be easily identified by reference to the check data repository. In other embodiments, the system may present an online banking customer with the unrecognized data to solicit input directly from the customer. For example, the customer may be presented with operator-defined terms of previously unrecognized data to verify if such terms are correct. The system may solicit corrective input from the customer via an online banking portal, a mobile banking application, and the like. If an operator initially determines that the handwriting on the memo line reads "house flaps," the customer may subsequently correct the operator's definition and update the check data repository so that the handwritten portion correctly corresponds to "mouse traps." In some embodiments, the customer's input is stored in a customer input repository, which is linked to the check data repository associated with the OCR processes. For example, the system can create a file path linking the customer input repository with the check data repository to automatically update the check data repository with the customer input. In other embodiments, the check data repository and/or customer input repository includes stored customer data or account data. Stored customer signatures, for example, may be included in the check data repository and/or customer input repository.

As illustrated at block 111, at least some of the inputted information is incorporated in the check data. In cases where the OCR processes utilizes a repository that includes manual input such as the check data repository or customer input repository, previously unrecognized data can be matched to definitions submitted by the operator and/or customer.

As illustrated at block 112, business strategies and transactions are processed based on at least one of the check data and the inputted information. Metadata extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

Figure 2:
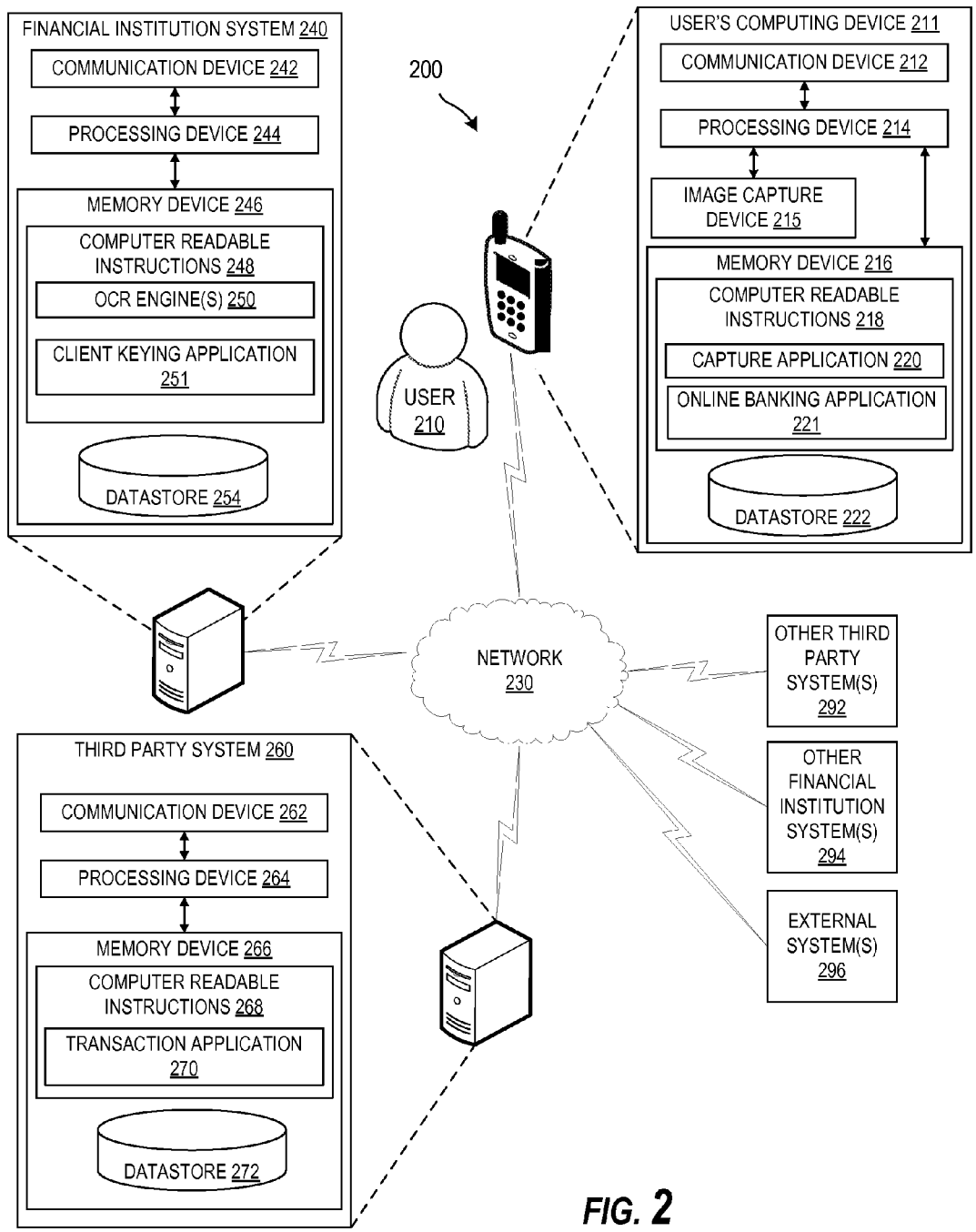
FIG. 2 provides a block diagram illustrating a system and environment for extracting and identifying check data in accordance with various embodiments.

Referring now to FIG. 2, a block diagram illustrates an environment 200 for detecting and extracting check data. The environment 200 includes a computing device 211 of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296. The systems and devices communicate with one another over a network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The computing device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's computing device 211 includes a communication device 212 and an image capture device 215 (e.g., a camera) communicably coupled with a processing device 214, which is also communicably coupled with a memory device 216. The processing device 214 is configured to control the communication device 212 such that the user's computing device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the user's computing device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the user's computing device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 3:
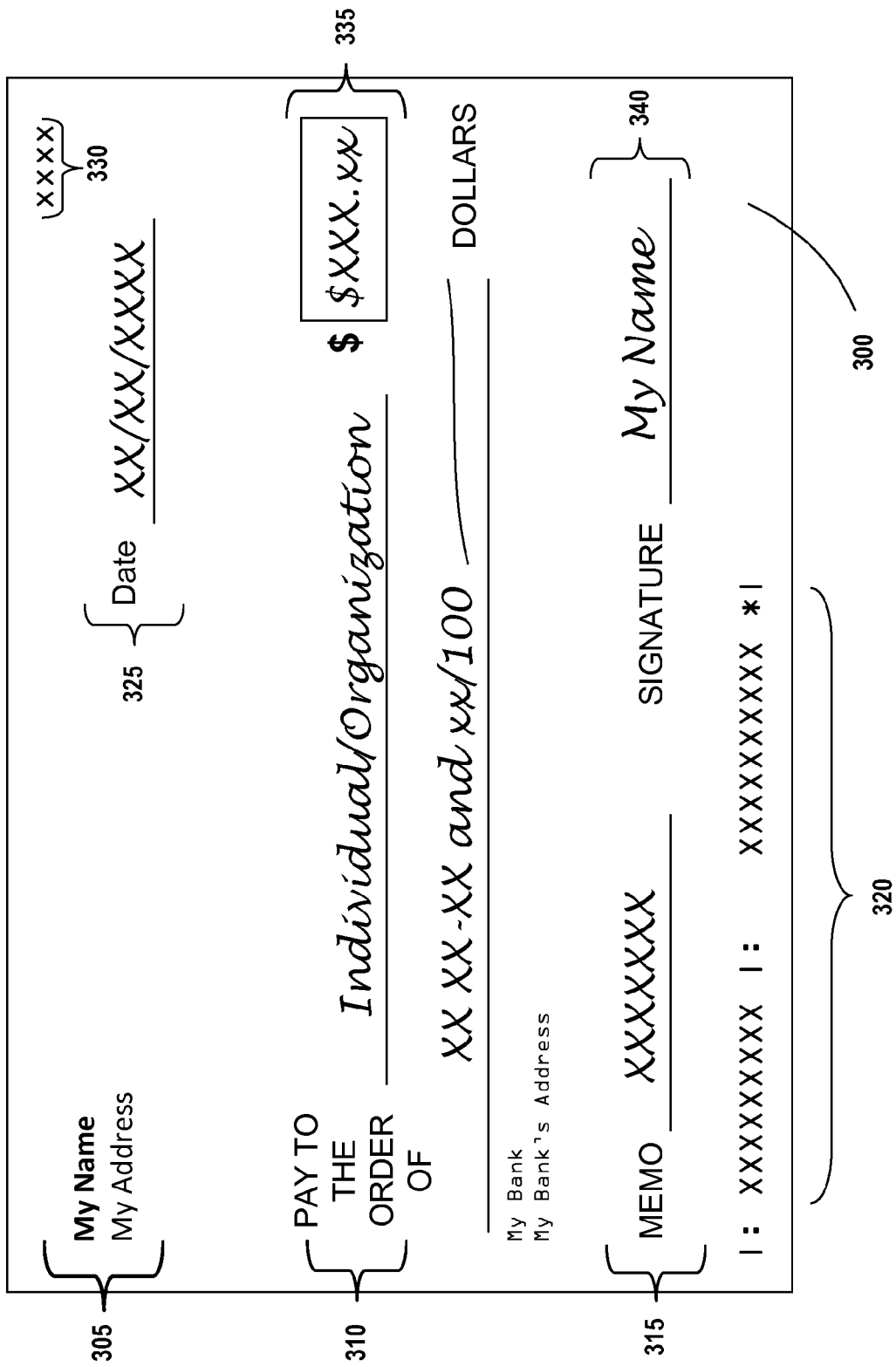
FIG. 3 illustrates an exemplary image of a financial record in accordance with various embodiments.

Referring now to FIG. 3, an exemplary image of a check 300 is illustrated. The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. A capture device (e.g., the user's computing device 212 of FIG. 2) may capture an image of the check 300 and transmit the image to a system of a financial institution (e.g., the financial institution system 240 of FIG. 2) via a network. The system may collect the check information from the image of the check 300 and store the check information in a datastore as metadata (e.g., the datastore 254 of FIG. 2). In some embodiments, the pieces of check information may be stored in the datastore individually. In other embodiments, multiple pieces of check information may be stored in the datastore together.

Figure 4:
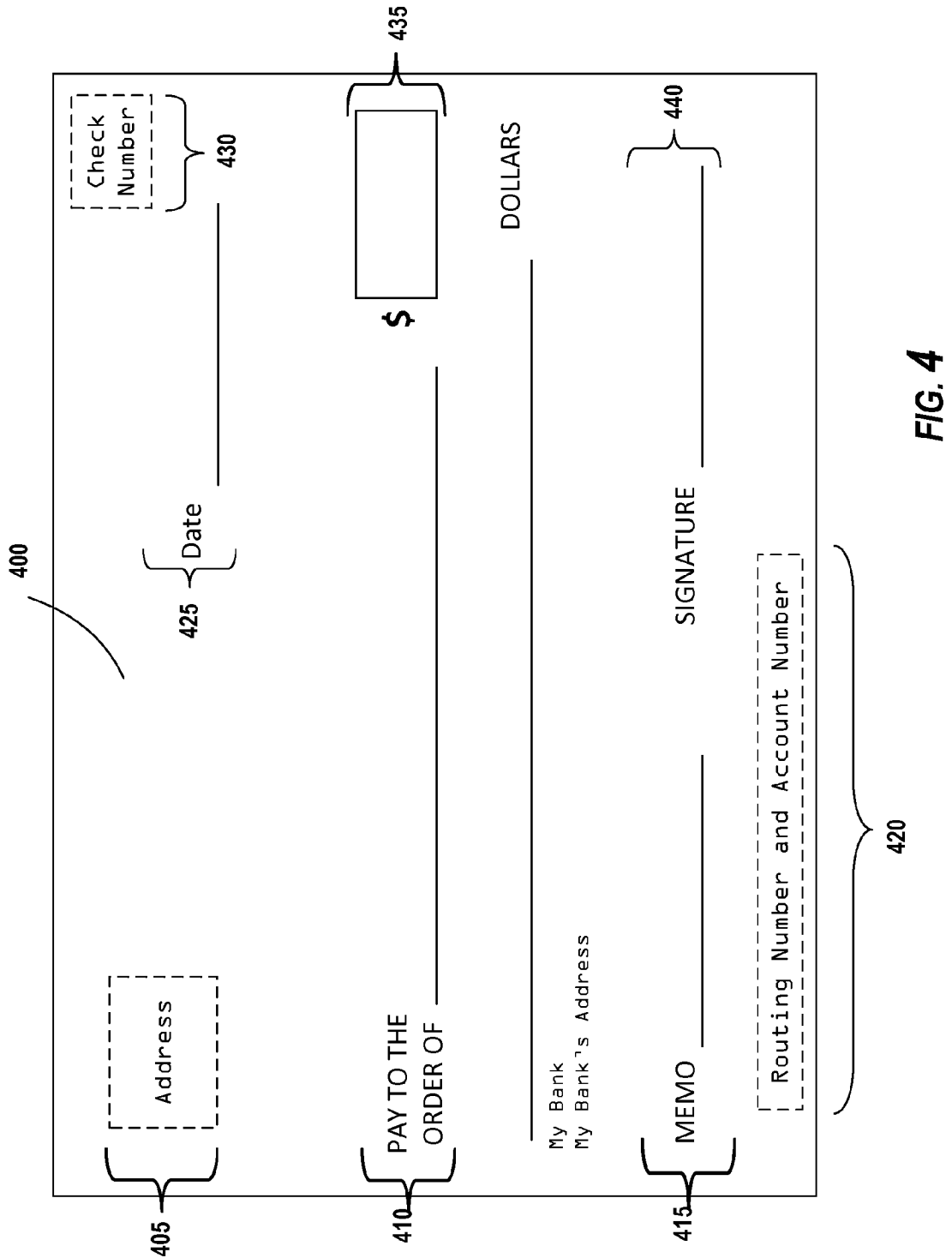
FIG. 4 illustrates an exemplary template of a financial record in accordance with various embodiments.

Referring now to FIG. 4, a check template 400 illustrated. In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system of process 100 any other system can "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

Figure 5:
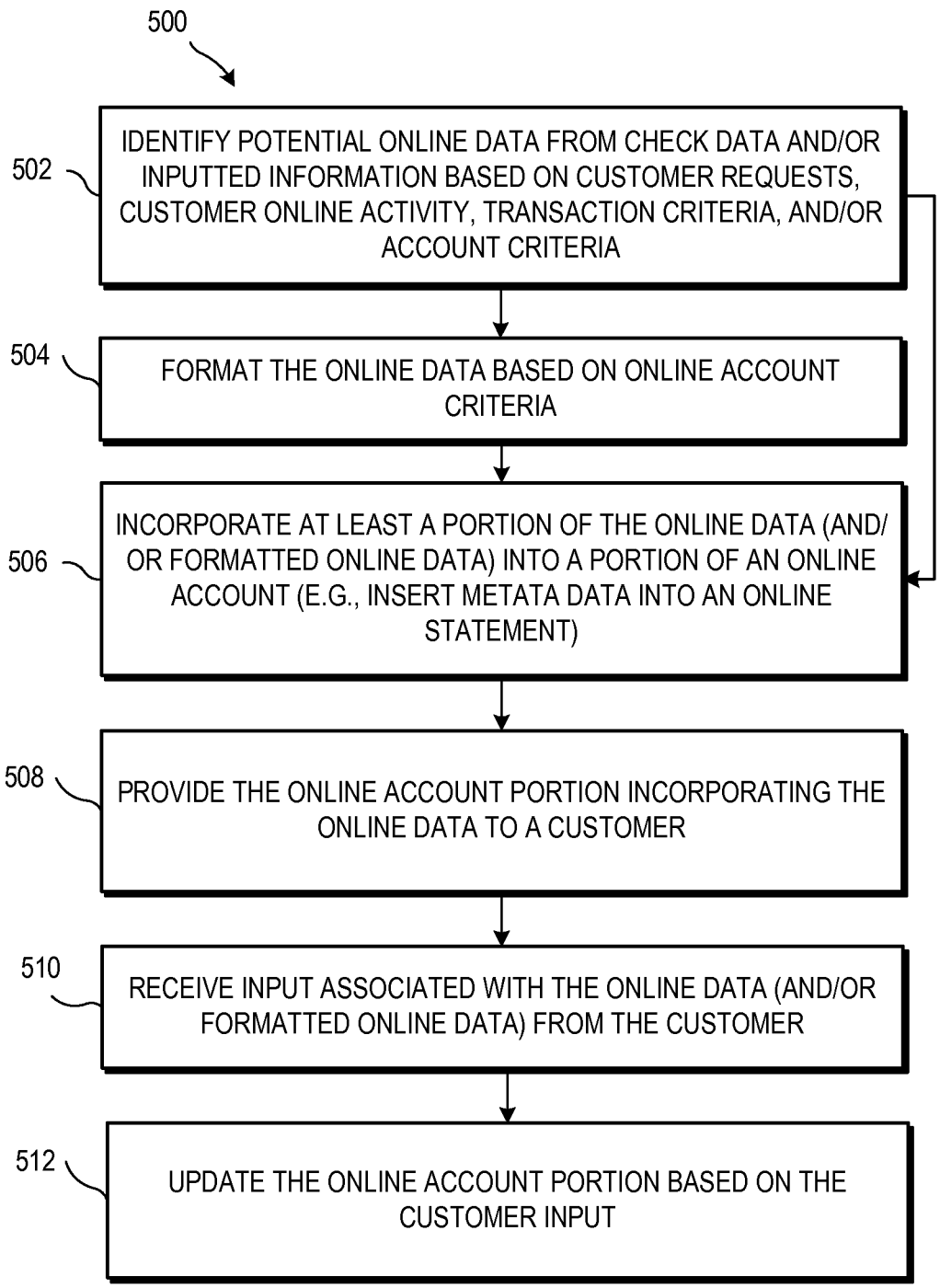
FIG. 5 is a flowchart illustrating a system and method for extracting check data for online accounts in accordance with various embodiments.

FIG. 5 illustrates a flowchart providing an overview of a process 500 for providing extracted check data for online accounts. One or more devices, such as the one or more computing devices and/or one or more other systems and/or servers of FIG. 2, can be configured to perform one or more steps of the process 500. In some embodiments, the one or more devices performing the steps are associated with a financial institution. In other embodiments, the one or more devices performing the steps are associated with a merchant, business, partner, third party, credit agency, account holder, and/or user.

As illustrated at block 502, potential online data from check data and/or inputted information is identified based on customer requests, customer online activity, transaction criteria, and/or account criteria. The check data and inputted information are discussed in further detail above with regard to FIG. 1. The potential online data includes any information that may be inputted into one or more portions of an online system such as an online banking account or other website portal. In other embodiments, the potential online data comprises additional data such as data derived from outside resources, which is discussed in more detail below. In still other embodiments, the potential online data includes the markings on the check described hereinabove. Markings captured in a check image such as watermarks, paper creases, and the like may not be converted to text using the OCR processes described herein, but still may be used to identify the potential online data. For example, a status symbol such as a check mark, logo, or time stamp on a check may be used to determine the entity that authorized the transaction and/or the time the check was processed.

In some embodiments, the potential online data is identified based on the customer requests. The customer includes online account subscribers, website members, account holders, customer of a financial institution, or any other entity that has access to online accounts. The system of process 500 may provide the customer with a portal to input suggestions for modifying or enhancing online statements or the system may prompt the customer for input. For example, an online banking account may include a comment box section, drop down menus for selecting modifications, online surveys, and the like. Also, the input associated with the customer requests may be extracted from posted messages, emails, complaints, online product or service reviews at host sites, publically available comments from social media, and the like.

The system of process 500 can pool customer requests, including input extracted from various internal and external sources, into a database and search for key terms, trends, and patterns in the pooled data to identify customers online account preferences. For example, the system may search for terms related to a specific merchant such as the name of a merchant chain; type of items purchased such as specific items (e.g., "printer") or general items (e.g., "electronics"); location of transaction such as zip codes and town names; and the like. Further, the system may search for increases or decreases in types of transactions, transaction amounts, and other account activity to predict future activity. The potential online data may be identified on a case-by-case basis such that the potential online data is specifically tailored to each customer's needs or desires, or the potential online data may be identified based on the most popular requests or search terms from the pooled data. For example, if 65% of the pooled data relates to transaction amounts in the form of savings, discounts, price increases, and the like, the system may identify the potential online data as including transaction amounts and indications as to whether certain transaction amounts have increased or decreased since the customer's last related transaction.

In other embodiments, the system of process 500 tracks the customer online activity to identify the potential online data. The online activity includes customer actions associated with an online banking account or other website and online accounts. Exemplary customer online activity includes clicking patterns, online session login times, time length of online session, types of online account pages visited, number of times an online account page is visited (per online session or period of time), amount of time spent on each online account page, outside websites visited, type and amount of customer input, online tool use, and the like.

In one example, the system may determine the potential online data includes a payee name based on the number of time per month the customer clicks to see check images on their online account. In other examples, the system may determine that the potential online data includes certain terms of a loan contract based on a customer's use of online loan interest rate calculators. In cases where multiple web pages visited by the customer on a regular basis include generalized or similar content, the system may identify the potential online data based on the number of times the customer clicks to arrive at the general page and/or the amount of time the customer spends on each selected page. For example, if a customer goes to a generalized credit card page every time they login to their online account, but only spends less than 10 seconds on the credit card page before clicking on a link related to a rewards summary located in the credit card page, the system may determine that the customer is particularly interest in credit card rewards and not new credit card offers, and may identify the potential online data as including reward calculations that should be included in the customer's credit card transaction statement.

In additional exemplary embodiments, activity outside of the customer's online account activity is used to identify the potential online data. For example, customers may be taken to a third party website such as a government agency website to learn about their legal rights when they select a link related to merchant purchase disputes. In such cases, the system of process 500 may identify the potential online data as including legal citations and helpful hints that may be placed in portions of the online account that are related to purchases. In other cases, publically available online data related to customers such as customer postings on social media, government records, real estate listings, and other third party data may be used to adjust the system's precision in identifying the potential online data. For example, if a register of deeds office publishes documents indicating a new real property purchase by a customer, the online system may use this data to provide new financial product offer to the customer or update the financial tools and reports on the customer's online account.

In further embodiments, the potential online data is identified based on the transaction criteria and/or the account criteria. Exemplary transaction criteria include a transaction amount, a transaction type, a party to the transaction, a transaction channel, and the like. The account criteria include account types (e.g., checking account, credit card account, online account, VIP accounts, and the like), account numbers, account holder status, age of the account, and the like. The transaction or account criteria, such as transaction amounts, can be used to determine if a merchant, payee, or payor should be extracted from a financial document image and provided in an online account. For example, all transaction over $500 may be tagged such that the system knows to include some of the tagged data (e.g., merchant or payee) in the potential online data. In other cases, some account having an elevated status may include enhanced tools and benefits that are not available in standard accounts. In such cases, the system may identify potential online data that includes calculations, reporting data, coding, and categorization that is derived from the check data.

As illustrated at block 504, the potential online data is formatted based on online account criteria. The online account criteria include rules, instructions, restrictions, guidelines, or requirements related to various security, privacy, and formatting parameters. Exemplary security parameters include security protocols, file formats, and so forth. Exemplary privacy parameters include rules that include internal and external privacy requirements. Exemplary formatting parameters include the number of characters per line, the type of font, the size of font, data placement, data format types, coloring schemes, stylization, numbering, and so forth.

In some exemplary embodiments, the formatted online data includes metadata. For example, the system of process 500 may convert data extracted from the check images to stable metadata. The online account criteria can include requirements that the potential online data not include macros, viruses, tags, or other components that may present security threats or create destabilization in the online account. The systems of process 500 may remove potentially harmful components from the potential online data. In further example, the size and type of font is formatted to match or provide contrast to the data on the online account. For example, very important data such as payment due dates may be in bold and red while other less urgent data may be matched to the black colored and size of font of the online account.

In some embodiments, the online criteria comprise legal rules or internal rules. The legal rules include regulations, laws, mandates, court orders, and other legal requirements. For example, some state or federal laws may require that certain information be provided to customers in a noticeable manner such that the customer is not likely to miss such information when reviewing financial transactional statements or other account data. For example, some of the potential online data may formatted to be in bold or positioned near the top of an online statement and not in small font at the bottom of the statement. In other examples, internal privacy rules may require that certain sensitive information such as a payee's home address or account number be partially or wholly redacted.

In some embodiments, the online criteria comprise customer input. For example, the customer input can include the customer requests described hereinabove. In addition, the customer input can include suggestions, comments, or requests related to text formats, paragraph styles, numbering, bullets, truncating words, position of data, and the like. For example, sight impaired customers may request that the potential online data include audio files that relay information, or customers may request that the potential online data be translated into a certain language. In situations where the customer has indicated that he or she intends to access the online account using a public machine or to access the online account in a public place, the system may format the potential online data to enhance security. For example, the potential online data may be in small font or light colored font so that it is more difficult for persons not sitting directly in front of the display to read, or the potential online data may be saved in a certain file format.

In other embodiments, the online account criteria comprise the location in the online account where the potential online data is to be provided. For example, the system may determine that some of the potential online account data is to be incorporated in an online statement, a certain web page or portion of a web page, and the like. Data associated with rewards such as purchases that qualify under a rewards program may be tagged as belonging in a rewards page summary, payee names may be tagged to monthly account statements, amounts related to budgeting categories may be tagged to customized budget summary pages, and so forth. In some embodiments, the online account data is formatted based on the online account location where the potential data is to be provided. Certain web pages or online statements may have specific style requirements. For example, due to space restrictions in some portions of an online account, the system may abbreviate some phrases or terms, resize font, delete text, and the like. In cases where an online account has an elevated status as discussed above, the system may highlight boxes in a reporting spreadsheet or insert help hints or comments in the reporting spreadsheet consistent with the elevated account status.

As illustrated at block 506, at least a portion of the online data and/or formatted online data is incorporated into at least a portion of an online account. The online account, in some embodiments, includes an online account associated with a financial institution such as an online banking account. The online account can also include other types of online accounts such as customer accounts associated with a merchant, financial planning accounts, and so forth. The portion of the online account can include one or more pages or sections of the online account, documents provided on the online account, online tools, and the like. For example, the portion of the online account may include online statements, transaction listings, calendars, calculators, account summaries, payment histories, and the like.

In some embodiments, the system of process 500 inserts the online account data (e.g., metadata) into an online statement. The online statement may include a periodic statement that can be downloaded from the online account or that is provided on a page of the online account. For example, the statement or other portion of the online account may be tagged with metadata. In some cases where the customer clicks on a check image to review payee names, for example, the inserted data can be used to replace one or more check images. In this way, the customer can easily view check data or other financial record data without having to click on a check image.

As illustrated at decision block 508, the online account portion incorporating the online data and/or formatted online data is provided to a customer. The customer includes account holders, agents of account holders, parties to a transaction, customers of a financial institution, merchant, or other organization, and the like. The customer may access the online account portion by logging into the online account or mobile application. In other cases, the online account portion may be provided to the user via email, text, or facsimile, or the online account portion may be in the form of a paper document such as a period statement that is mailed to the customer. An example of the online account portion is provided in FIG. 6.

In additional embodiments, the system of process 500 modifies the check data repository associated with the OCR processes with the received input. In this way, the system can adjust the OCR processes and use the most correct and updated information in the OCR processes. For example, the system can include a separate repository for customer input, and link the customer input repository with the check data repository such that the OCR process can include corrections, modification, and additional data received from customers.

As illustrated at block 510, input associated with the online data and/or formatted online data is received from the customer. Exemplary customer input includes corrections, updates, additions, deletions, remarks, and the like. In some embodiments, the customer corrects misspellings, grammatical errors, incorrect data, and so forth. For example, if the OCR processes or operator input results in a misspelling of a payee name, the process 500 allows a customer to correct the misspelling or provide instructions for fixing the misspelling. In other examples, the system may receive remarks from the customer regarding how the online account portion or data in the online account should be formatted or requests for additional information.

In additional embodiments, the system of process 500 identifies outside data to include in the online account portion. Exemplary outside data includes calculations, transaction trends, market trends, graphs, account projections, additional data not provided in the check images, new product suggestions, and the like. The outside data may be gathered from many different sources such as publically available social media, account data, internal reports, third party reports, government sources, public records, and the like. The outside data may be used to supplement the online data, provide missing data, make corrections to the online data, calculate interest rates, predict future spending and saving trends, identify related transaction, and the like.

As illustrated at block 512, the online account portion is updated based on the customer input. In cases where the online account portion is provided to the customer via email, paper copy, or other means outside of the online account, the system may republish the online account portion.

Referring now to FIG. 6, an exemplary graphical user interface (GUI) 600 is provided. The GUI 600 includes an online statement 610. In some embodiments, a customer accesses the online statement by logging into an online banking account or mobile banking application. The online statement 610 in the illustrated embodiment relates to a checking account and lists transaction dates, check numbers associated with each transaction, the amount of each transaction, payee names, and description of the transaction. As shown in FIG. 6, a list of other possible categories of data can be included in the online statement such as payor data, data present in the memo line of a check, related transactions, remaining account balance, and transaction time. The selected category or data can be added in a separate column or added to an existing column of the online statement 610. For example, transaction times may be placed underneath the dates in the transaction date column, and payor data may be placed in a separate column.

The remaining account balance data may be placed in its own separate column or placed in the transaction amount column. The remaining account balance data can be calculated as a total at the end of the online statement period, or calculated based on each transaction in the online statement. In cases where the remaining account balance is calculated at the end of the period, the remaining account balance may be placed at the bottom of the online statement after the last transaction for the period. The related transactions may be placed in a separate column. The related transactions may be identified based on account numbers, payee or payor names, transaction dates, transaction amount, items purchased, transaction channel, and so forth. For example, the related transactions may include purchases associated with the same or similar merchants, ATM withdrawals during the same or previous period of times, the past six automatic bill pay transaction, and the like. The memo line data may be used to aid in identifying the related transactions. The memo line data may also be used to correct the transaction descriptions, enhance the transaction descriptions, or such data may be provided in a separate column.

In addition to allowing the customer to add columns or modify existing columns, the customer, in some embodiments, can prompt the system to delete data in the columns or rows. For example, the customer may right click on the column heading to remove a column or right click on data in the columns or rows to remove specific data.

Further illustrated in FIG. 6 is a pop-up window 650 for inputting information. The customer can double click or otherwise select on any of the payee names in the payee column to access the pop-up window 650. The customer may edit the payee information by typing a different payee name, a correction to the listed payee name, or additional information related to the payee name such as a nickname, the payee's full name, an address, and so forth. The customer may also be provided with suggestions for correcting or modifying the payee information. The system may determine the suggestions from past transactions, current payee names, check data repository, and the like. Further, the pop-up window 650 may also include a request field (not shown) that allows the user to enter request for additional information associated with the payee such as past transaction associated with the payee, the payee's contact information, and so forth. Although the illustrated embodiment shows that the data in the payee column can be edited by selecting a particular payee, it will be understood that any data in the online statement can be modified in the same or similar manner.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for extracting check data from images of paper checks for online accounts, the system comprising:
    a computer apparatus including a processor and a memory;
    an image capture device; and
    a software module stored in the memory, comprising executable instructions that when executed by the processor cause the processor to:
    receive a paper check associated with a customer, and capture a check image of the paper check using the image capture device;
    apply an optical character recognition process to at least a portion of the check image;
    convert at least a portion of image based data from the check image to text based data, wherein converting the image based data to the text based data comprises encoding the image based data into text based files that are configured to be edited and searched;
    identify check data in the text based data comprising at least one of a payee name, a payor name, a date, a payment amount, a check number, and an endorsement;
    identify online data associated with the customer, from the check data and from inputted information based on customer requests, customer online activity, transaction criteria and account criteria, wherein identifying the online data further comprises:
        identifying the image based data not converted to text based data, the image based data comprising at least one of a time stamp, a logo or a symbol related to an entity associated with authorizing a transaction with the paper check;
        tracking customer online activity associated with an online banking account associated with the entity identified from the image based data, including tracking a number of times each of a plurality of online account pages is visited during an online banking session and an amount of time spent on each of the plurality of online account pages during the online banking session;
        determining that one of the online account pages is potentially more interesting to the customer based on the customer visiting the online account page more than others and spending more time on the online account page than others during the online banking session; and
        determining customer preferences based on the customer online activity and the online account page that is potentially more interesting to the customer;
    format the online data based on online account criteria, wherein the formatted online data comprises stable metadata;
    initiate automated processing of the transaction associated with the paper check, based on at least the stable metadata;
    incorporate at least a portion of the online data into a portion of an online account of the customer, wherein at least the portion of the online data is determined based on at least the check data and the online data; and
    provide the online account portion to the customer on a customer computing device, wherein providing the online account portion to the customer further comprises:
        initiating presentation of a graphical user interface associated with an online banking account of the customer; and inserting the online account portion in the graphical user interface, proximate to a display of one or more transactions associated with the online banking account.

2. The system of claim 1,
wherein initiating the automated processing of the transaction associated with the paper check further comprises utilizing the metadata to remediate exception processing, enforce requirements regarding third party check deposits and facilitate automated clearing house transactions; and
wherein the online account criteria includes at least one of security parameters, internal and external privacy parameters, and formatting parameters.

3. The system of claim 2, wherein the executable instructions further cause the processor to:
redact at least a portion of the online account data, add calculations and reports to the online account data consistent with a status of the online account, or modify the style of text in the online account data.

4. The system of claim 1, wherein the executable instructions further cause the processor to:
receive input associated with the online data from the customer;
update the online account portion based on the customer input;
wherein the customer input includes data corrections, data updates, and requests for additional information.

5. The system of claim 4, wherein the executable instructions further cause the processor to:
reposition the online data in an online account statement in response to the received input.

6. The system of claim 1, wherein the OCR process includes location fields for determining the position of data on the check image.

7. The system of claim 1, wherein the check image further comprises unrecognizable data that is not configured to be identified by the optical character recognition process, wherein the executable instructions further cause the processor to:
detect unrecognized data from the check image, wherein the optical character recognition process is not applied on the unrecognizable data;
construct a corrected check image, wherein constructing the corrected check image further comprises (i) performing pre-processing of the unrecognized data, (ii) receiving input information identifying the unrecognized data from an operator, or (iii) removing the unrecognized data from the check image; and
apply the optical character recognition process to the corrected check image;
wherein performing pre-processing of the unrecognized data comprises enhancing the unrecognized data comprising misaligned or blurry data and wherein the check data comprises at least a portion of the inputted information.

8. The system of claim 7, wherein the executable instructions further cause the processor to:
receive additional input information from a customer;
correct the operator inputted information based on the additional input.

9. The system of claim 7, wherein the check data further comprises financial record data comprising terms of a financial record, time period that the financial record is in effect, account numbers, merchant codes, file identifiers, or source identifiers.

10. The system of claim 1, wherein the online account portion comprises an online statement, a financial record, an online financial account web page, or an online tool.

11. A computer program product for extracting check data from images of paper checks for online accounts, the computer program product comprising:
a non-transitory computer readable storage medium having computer readable program code embodied therewith, the computer readable program code comprising:
computer readable program code configured to capture a check image of a paper check associated with a customer, using an image capture device;
computer readable program code configured to apply an optical character recognition process to at least a portion of the check image;
computer readable program code configured to convert at least a portion of image based data from the check image to text based data, wherein converting the image based data to the text based data comprises encoding the image based data into text based files that are configured to be edited and searched;
computer readable program code configured to identify check data in the text based data comprising at least one of a payee name, a payor name, a date, a payment amount, a check number, and an endorsement;
computer readable program code configured to identify online data associated with the customer, from the check data and from inputted information based on customer requests, customer online activity, transaction criteria and account criteria wherein identifying the online data further comprises:
identifying the image based data not converted to text based data, the image based data comprising at least one of a time stamp, a logo or a symbol related to an entity associated with authorizing a transaction with the paper check;
tracking customer online activity associated with an online banking account associated with the entity identified from the image based data, including tracking a number of times each of a plurality of online account pages is visited during an online banking session and an amount of time spent on each of the plurality of online account pages during the online banking session;
determining that one of the online account pages is potentially more interesting to the customer based on the customer visiting the online account page more than others and spending more time on the online account page than others during the online banking session; and
determining customer preferences based on the customer online activity and the online account page that is potentially more interesting to the customer;
computer readable program code configured to format the online data based on online account criteria, wherein the formatted online data comprises stable metadata;
computer readable program code configured to initiate automated processing of the transaction associated with the paper check, based on at least the stable metadata;
computer readable program code configured to incorporate at least a portion of the online data into a portion of an online account of the customer, wherein at least the portion of the online data is determined based on at least the check data and the online data; and
computer readable program code configured to provide the online account portion to the customer on a customer computing device, wherein providing the online account portion to the customer further comprises:

initiating presentation of a graphical user interface associated with an online banking account of the customer; and inserting the online account portion in the graphical user interface, proximate to a display of one or more transactions associated with the online banking account.

12. The computer program product of claim 11, wherein the online account criteria includes at least one of security parameters, internal and external privacy parameters, and formatting parameters.

13. The computer program product of claim 12, further comprising computer readable program code configured to redact at least a portion of the online account data, add calculations and reports to the online account data consistent with a status of the online account, or modify the style of text in the online account data.

14. The computer program product of claim 11, further comprising computer readable program code configured to receive input associated with the online data from the customer and update the online account portion based on the customer input, wherein the customer input includes data corrections, data updates, and requests for additional information.

15. The computer program product of claim 11, wherein the check image further comprises unrecognizable data that is not configured to be identified by the optical character recognition process, the non-transitory computer readable storage medium further comprising computer readable program code configured to:

detect unrecognized data from the check image, wherein the optical character recognition process is not applied on the unrecognizable data;

construct a corrected check image, wherein constructing the corrected check image further comprises (i) performing pre-processing of the unrecognized data, (ii) receiving input information identifying the unrecognized data from an operator, or (iii) removing the unrecognized data from the check image; and apply the optical character recognition process to the corrected check image;

wherein performing pre-processing of the unrecognized data comprises enhancing the unrecognized data comprising misaligned or blurry data and wherein the check data comprises at least a portion of the inputted information.

16. The computer program product of claim 15, further comprising computer readable program code configured to receive additional input information from a customer and correct the operator inputted information based on the additional input.

17. A computer-implemented method for extracting check data from images of paper checks for online accounts, the method comprising:

receiving a paper check associated with a customer, and capturing a check image of the paper check using an image capture device;

applying, by a processor, an optical character recognition process to at least a portion of the check image;

converting, by a processor, at least a portion of image based data from the check image to text based data, wherein converting the image based data to the text based data comprises encoding the image based data into text based files that are configured to be edited and searched;

identifying, by a processor, check data in the text based data comprising at least one of a payee name, a payor name, a date, a payment amount, a check number, and an endorsement;

identifying, by a processor, online data associated with the customer, from the check data and from inputted information based on customer requests, customer online activity, transaction criteria and account criteria, wherein identifying the online data further comprises:

identifying the image based data not converted to text based data, the image based data comprising at least one of a time stamp, a logo or a symbol related to an entity associated with authorizing a transaction with the paper check;

tracking customer online activity associated with an online banking account associated with the entity identified from the image based data, including tracking a number of times each of a plurality of online account pages is visited during an online banking session and an amount of time spent on each of the plurality of online account pages during the online banking session;

determining that one of the online account pages is potentially more interesting to the customer based on the customer visiting the online account page more than others and spending more time on the online account page than others during the online banking session; and determining customer preferences based on the customer online activity and the online account page that is potentially more interesting to the customer;

formatting, by a processor, the online data based on online account criteria, wherein the formatted online data comprises stable metadata;

initiating, by a processor, automated processing of the transaction associated with the paper check, based on at least the stable metadata;

incorporating, by a processor, at least a portion of the online data into a portion of an online account of the customer, wherein at least the portion of the online data is determined based on at least the check data and the online data; and providing, by a processor, the online account portion to the customer on a customer computing device, wherein providing the online account portion to the customer further comprises:

initiating presentation of a graphical user interface associated with an online banking account of the customer; and inserting the online account portion in the graphical user interface, proximate to a display of one or more transactions associated with the online banking account.

18. The computer-implemented method of claim 17, wherein the online account criteria includes at least one of security parameters, internal and external privacy parameters, and formatting parameters.

19. The computer-implemented method of claim 18, further comprising:

redacting, by a processor, at least a portion of the online account data;

adding, by a processor, calculations and reports to the online account data consistent with a status of the online account; or modifying, by a processor, the style of text in the online account data.

20. The computer-implemented method of claim 17, further comprising:

receiving input associated with the online data from the customer; and updating the online account portion based on the customer input, wherein the customer input includes data corrections, data updates, and requests for additional information.

\* \* \* \* \*